United States Patent
Chang et al.

(10) Patent No.: US 8,284,354 B2
(45) Date of Patent: Oct. 9, 2012

(54) LIQUID CRYSTAL ON SILICON DISPLAY PANEL AND ELECTRONIC DEVICE USING THE SAME

(75) Inventors: Yin-Hsie Chang, Tainan County (TW); Chun-Hao Su, Tainan County (TW); Bing-Jei Liao, Tainan County (TW)

(73) Assignee: Himax Display, Inc., Tainan County (TW)

( * ) Notice: Subject to any disclaimer, the term of this patent is extended or adjusted under 35 U.S.C. 154(b) by 397 days.

(21) Appl. No.: 12/421,070

(22) Filed: Apr. 9, 2009

(65) Prior Publication Data

US 2009/0195739 A1 Aug. 6, 2009

Related U.S. Application Data

(63) Continuation-in-part of application No. 12/068,167, filed on Feb. 4, 2008, now abandoned.

(51) Int. Cl.
*G02F 1/1333* (2006.01)
*G02F 1/1335* (2006.01)
(52) U.S. Cl. ........................................ 349/110; 349/137
(58) Field of Classification Search .................. None
See application file for complete search history.

(56) References Cited

U.S. PATENT DOCUMENTS

| 6,005,651 | A | 12/1999 | Takahara et al. |
| 6,256,080 | B1 * | 7/2001 | Colgan et al. .................. 349/129 |
| 7,916,247 | B2 * | 3/2011 | Nagasawa ..................... 349/110 |
| 2006/0279687 | A1 * | 12/2006 | Park et al. ..................... 349/142 |
| 2006/0290841 | A1 | 12/2006 | Kwon et al. |
| 2007/0058100 | A1 | 3/2007 | Ishii |
| 2007/0109470 | A1 | 5/2007 | Hosoya |
| 2009/0195736 | A1 | 8/2009 | Su et al. |

FOREIGN PATENT DOCUMENTS

TW 200612167 4/2012

\* cited by examiner

*Primary Examiner* — Tina Wong
(74) *Attorney, Agent, or Firm* — Rabin & Berdo, P.C.

(57) ABSTRACT

A liquid crystal on silicon (LCOS) display panel and an electronic device using the same are provided. The electronic device comprises the LCOS display panel and a circuit board. The LCOS display panel comprises a silicon substrate, a transparent substrate and a liquid crystal layer. The transparent substrate has a base plate and a mask layer. The circuit board is electrically connected to the display panel. The transparent substrate is disposed opposite to the silicon substrate, and the liquid crystal layer is positioned between the silicon substrate and the transparent substrate. The base plate has a first surface and a second surface opposite to the first surface that faces the silicon substrate. The mask layer is disposed on the second surface and has at least one opening to form at least one light-transmitting region and one light-blocking region, and the light-transmitting region is a displaying region of the transparent substrate.

18 Claims, 14 Drawing Sheets

LIQUID CRYSTAL ON SILICON DISPLAY PANEL AND ELECTRONIC DEVICE USING THE SAME

This is a continuation-in-part application of application Ser. No. 12/068,167, filed on Feb. 4, 2008.

BACKGROUND OF THE INVENTION

1. Field of the Invention

The invention relates in general to a liquid crystal on silicon (LCOS) display panel and an electronic device using the same, and more particularly to an LCOS display panel with a light-blocking region and an electronic device using the same.

2. Description of the Related Art

Along with the advance in technology, electronic devices with displaying images have been widely used. According to the difference in optical paths, the display panel of electronic device is divided into transmission display panel and reflection display panel. Of the reflection display panel, the LCOS display panel, having the features of better resolution and low power consumption, has great popularity.

Figure 1:
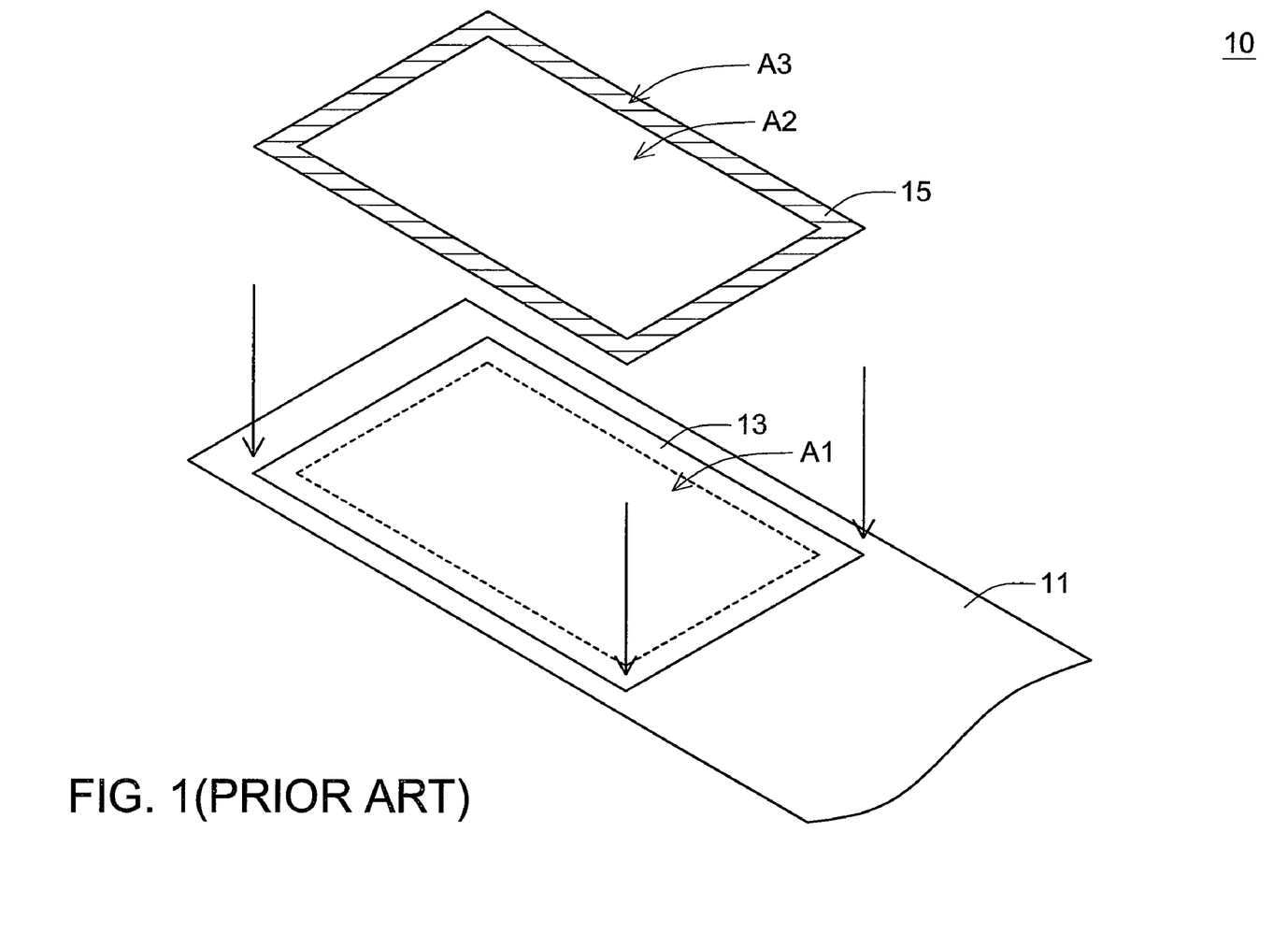
FIG. 1 is a perspective of an LCOS display panel of a conventional electronic device.

Referring to FIG. 1, a perspective of an LCOS display panel of a conventional electronic device is shown. The electronic device 10 comprises a circuit board 11, a display panel 13, and a shadow film 15. The circuit board 11 is electrically connected to the display panel 13. The display panel 13 has a preset-displaying region A1. The display panel 13 allows the light to enter in and then generates a reflective light from a silicon substrate (not shown in FIGs) of the display panel 13 to display an image. Besides, the electronic device 10 further comprises the shadow film 15. The shadow film 15 has a light-transmitting region A2 and a light-blocking region A3. The shadow film 15 is disposed on the display panel 13. The light-blocking region A3 covers a part of the display panel 13 to block the light for preventing the unexpected reflective light from the display panel 13. The image of the display panel 13 is displayed within the light-transmitting region A2 of the shadow film 15, so the light-transmitting region A2 is disposed in correspondence to the preset-displaying region A1 of the display panel 13. The area of the light-transmitting region A2 is substantially the same with that of the preset-displaying region A1.

Assembling the conventional electronic device 10, the display panel 13 and the shadow film 15 are aligning-bound mechanically. Mounting error is inevitable during the assembly of the shadow film 15 and the display panel 13, and the value of the mounting error will be enlarged from hundreds of μm to several mm on a projecting image projected from the display image of the display panel 13 used in a projector. Such mounting error will cause the light-blocking region A3 of shadow film 15 to block the preset-displaying region A1 of the display panel 13 and affect the display quality at the edge of the image, hence deteriorating the yield rate of the electronic device.

SUMMARY OF THE INVENTION

The invention is directed to a liquid crystal on silicon (LCOS) display panel and an electronic device using the same. The LCOS display panel comprises a light-blocking region and a light-transmitting region. The light-transmitting region is a displaying region of the display panel for preventing mechanically mounting error.

According to a first aspect of the present invention, a liquid crystal on silicon (LCOS) display panel is provided. The display panel comprises a silicon substrate, a transparent substrate and a liquid crystal layer. The transparent substrate is disposed opposite the silicon substrate, and the liquid crystal layer is positioned between the silicon substrate and the transparent substrate. The transparent substrate comprises a base plate and a mask layer. The base plate has a first surface and a second surface opposite the first surface that faces the silicon substrate. The mask layer is disposed on the second surface of the base plate and has at least one opening to form at least one light-transmitting region and one light-blocking region on the base plate. The light-transmitting region is a displaying region of the transparent substrate.

According to a second aspect of the present invention, an electronic device comprising an LCOS display panel and a circuit board is provided. The display panel comprises a silicon substrate, a transparent substrate and a liquid crystal layer. The transparent substrate comprises a base plate and a mask layer. The circuit board is electrically connected to the display panel. The transparent substrate is disposed opposite the silicon substrate, and the liquid crystal layer is positioned between the silicon substrate and the transparent substrate. The base plate has a first surface and a second surface opposite the first surface that faces the silicon substrate. The mask layer of the transparent substrate is disposed on the second surface and has at least one opening to form at least one light-transmitting region and one light-blocking region on the base plate. The light-transmitting region is a displaying region of the transparent substrate.

The invention will become apparent from the following detailed description of the preferred but non-limiting embodiments. The following description is made with reference to the accompanying drawings.

DETAILED DESCRIPTION OF THE INVENTION

First Embodiment

Figure 2:
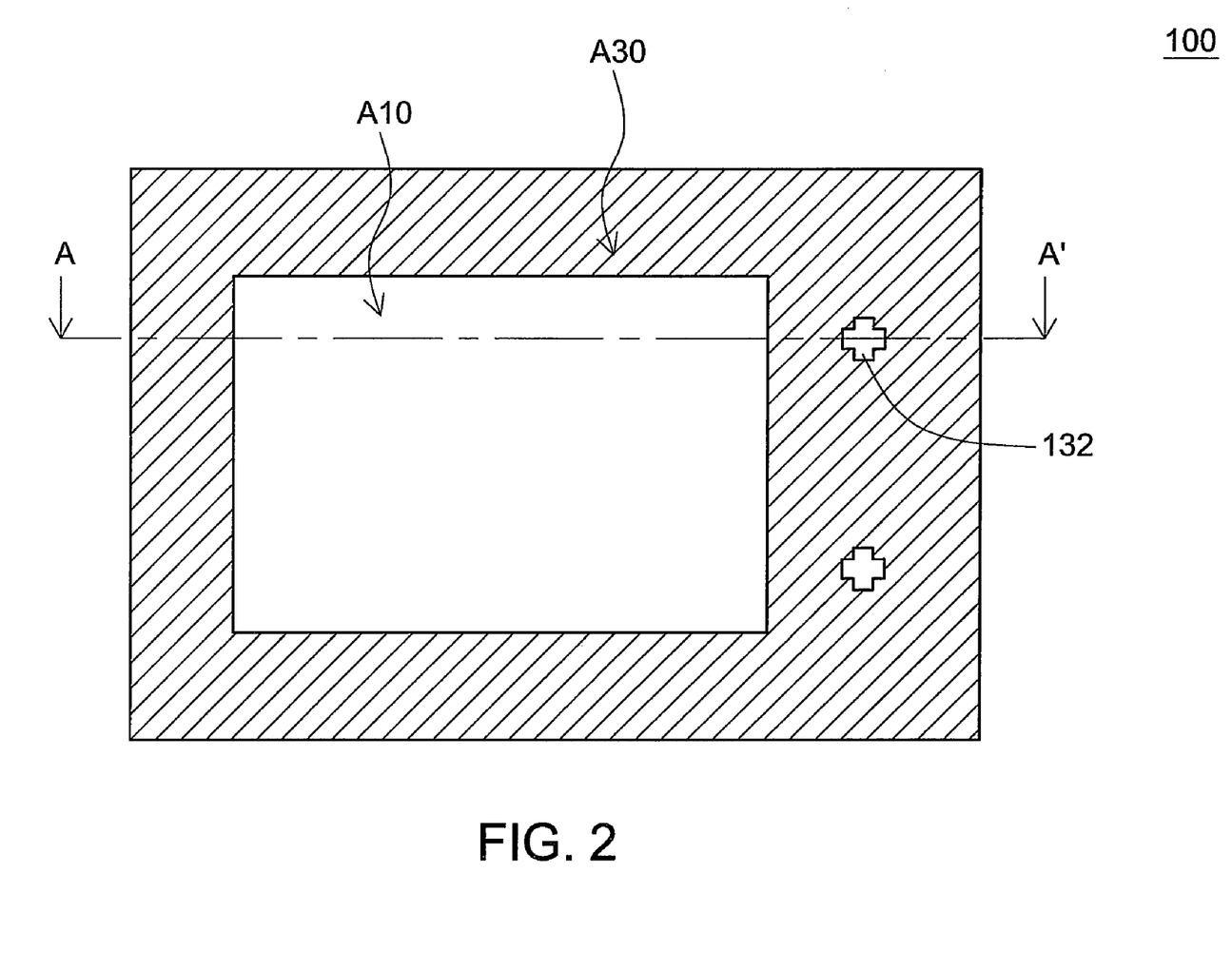
FIG. 2 is a top view of an LCOS display panel according to a first embodiment of the invention.
Figure 3A:
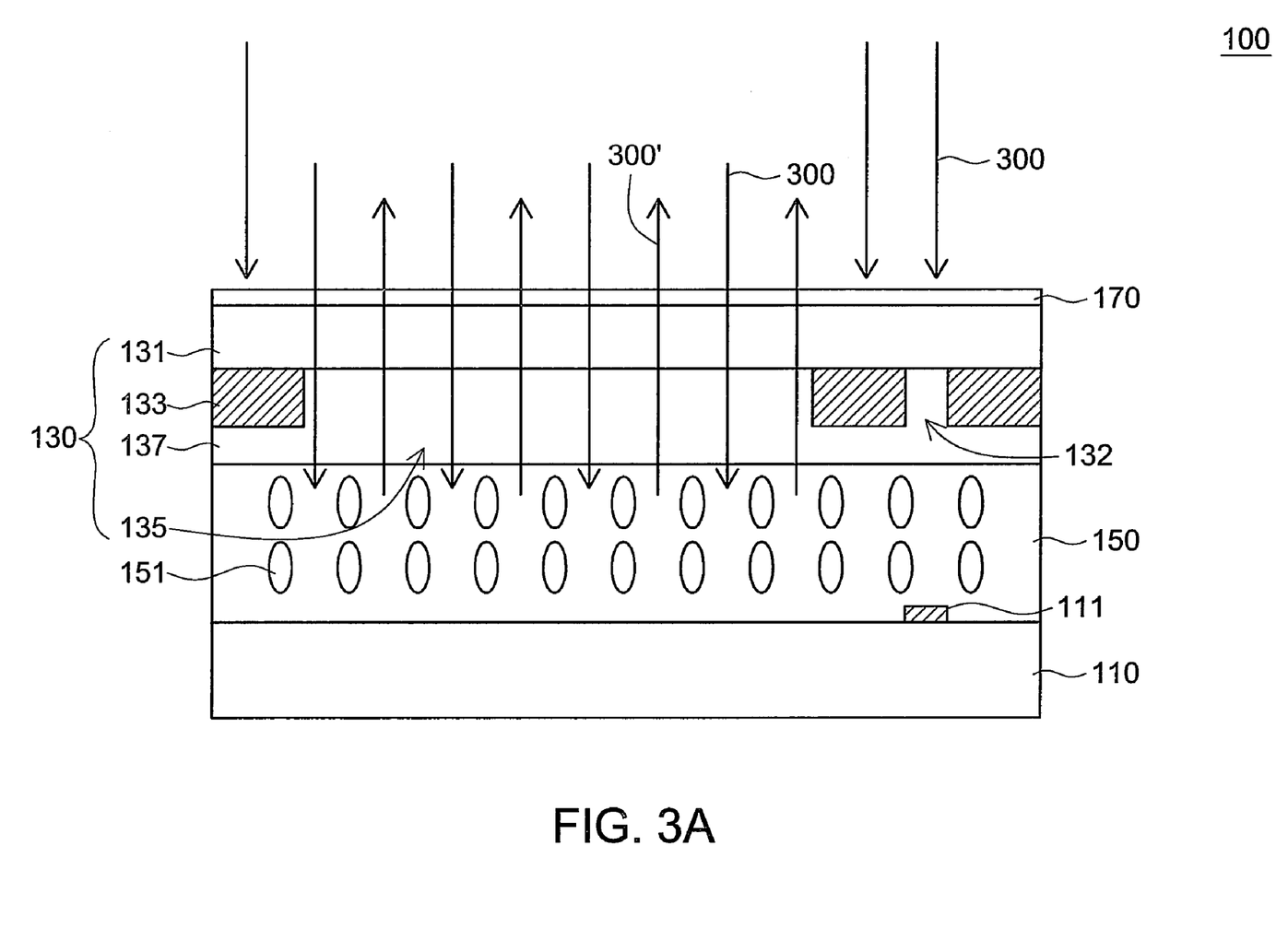
FIG. 3A is a cross-sectional view of the LCOS display panel of FIG. 2 along A-A' segment.

Refer to FIGS. 2 and 3A. FIG. 2 is a top view of an LCOS display panel according to a first embodiment of the invention. FIG. 3A is a cross-sectional view of the LCOS display panel of FIG. 2 along A-A' segment. The LCOS display panel 100 comprises a silicon substrate 110, a transparent substrate 130 and a liquid crystal layer 150. The transparent substrate 130 is disposed opposite the silicon substrate 110, and the liquid crystal layer 150 is positioned between the silicon substrate 110 and the transparent substrate 130. The transparent substrate 130 comprises a base plate 131 and a mask layer 133. The mask layer 133 is disposed on the base plate 131 and has at least one opening 135 for the transparent substrate 130 to form at least one light-transmitting region and one light-blocking region A30. The light-transmitting region is a displaying region A10 of the transparent substrate 130.

As indicated in FIG. 2 and FIG. 3A, the size of the opening 135 is the area of the light-transmitting region. In other words, the boundary of the displaying region A10 of the LCOS display panel 100 is defined by the boundary of the light-blocking region A30.

The transparent substrate 130 further comprises a conductive layer 137. The conductive layer 137 is disposed between the liquid crystal layer 150 and the mask layer 133 and fills in the opening 135 for covering the base plate 131. The conductive layer 137 generates electrical fields with the control circuit (not shown in the FIGs) of the silicon substrate 110 to control the rotation of the liquid crystal molecules 151 of the liquid crystal layer 150. That is, the liquid crystal molecules 151 of the LCOS display panel 100 within the control circuit region are controllable. An incident light 300 passing through the transparent substrate 130 and the liquid crystal layer 150 arrives the silicon substrate 110, and then forms a reflective light 300' on the silicon substrate 110. Then, the reflective light 300' passing through the liquid crystal layer 150 and the transparent substrate 130 leaves the LCOS display panel 100 to the user for viewing the displayed image. The LCOS display panel 100 can control the rotating direction of the liquid crystal molecules 151 by the control circuits of the silicon substrate 110 and the conductive layer 137, and further adjust the angles of the incident light 300 and the reflective light 300' to generate the image desired by the user.

The transparent substrate 130 further comprises a first alignment figure 132 positioned within the light-blocking region A30. As indicated in FIG. 3A, the silicon substrate 110 further comprises a second alignment figure 111. For example, the first alignment figure 132 and the second alignment figure 111 are formed as a cross pattern, respectively. In the manufacturing process, the first alignment figure 132 is optically aligned with the second alignment figure 111 by an alignment device. Thus, the transparent substrate 130 can be precisely aligned with the silicon substrate 110 by means of the first alignment figure 132 and the second alignment figure 111, and the displaying region A10 is positioned in a predetermined location. That is, through the optical alignment of the first alignment figure 132 and the second alignment figure 111, the displaying region A10 precisely corresponds to the control circuit region disposed on the silicon substrate 110.

Figure 4:
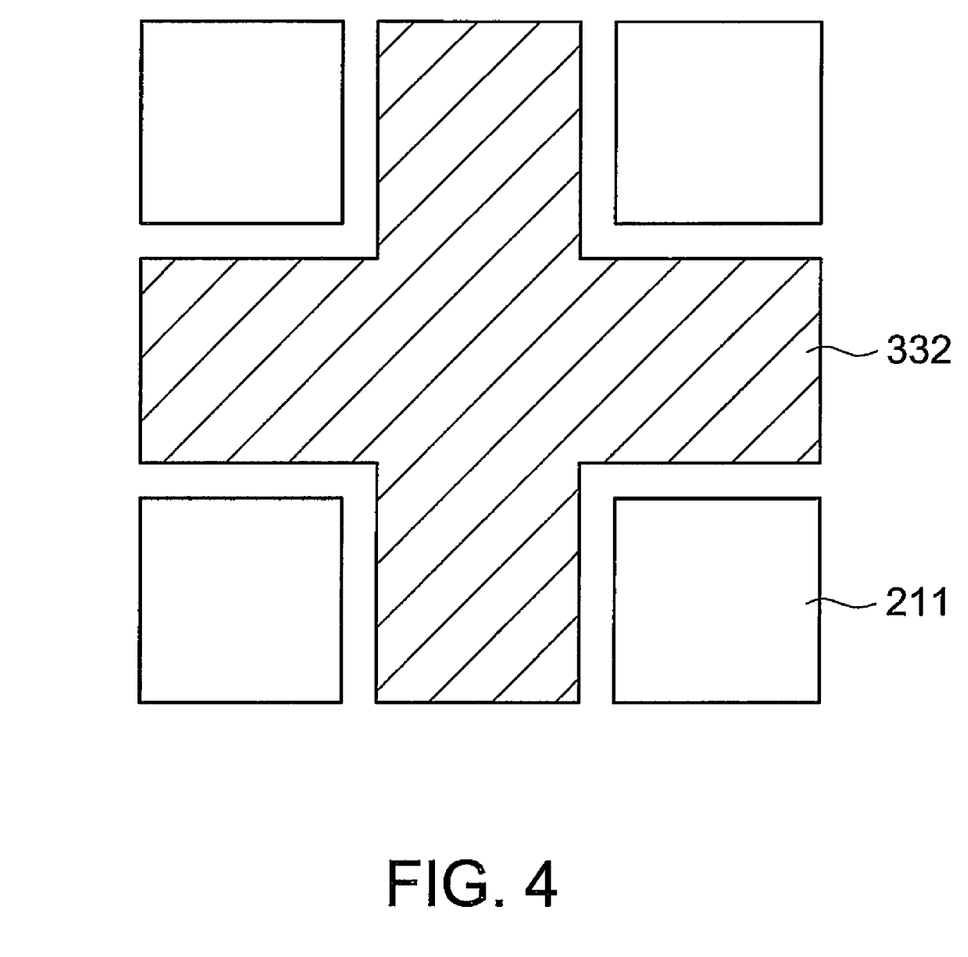
FIG. 4 is a perspective of another pattern of the alignment figures of the invention.

As indicated in FIG. 3A, the first alignment figure 132 is, for example, a hole or an indentation on the mask layer 133, wherein the hole is extended to the base plate 131. In this embodiment of the present invention, the first alignment figure 132 of the transparent substrate 130 is a through hole. Although the first alignment figure 132 and the second alignment figure 111 according to the first embodiment of the invention are described above, other alignment methods and different alignment figures or colors can be used in the invention. For example, referring to FIG. 4, a perspective of another pattern of the alignment figures of the invention is shown. The first alignment figure 332 can be positioned on the transparent substrate 130 (shown in the FIG. 3A) or the silicon substrate 110 (shown in the FIG. 3A), and the second alignment figure 211 is correspondingly determined on the silicon substrate 110 or the transparent substrate 130. As shown in FIG. 4, the first alignment figure 332 is complementary to the second alignment figure 211. Thus, the transparent substrate 130 can be precisely aligned with the silicon substrate 110 by means of the first alignment figure 332 and the second alignment figure 211.

Besides, as shown in FIG. 3A, the LCOS display panel 100 further comprises an anti-reflection layer 170 disposed on the transparent substrate 130. In this embodiment of the present invention, the anti-reflection layer 170 is disposed opposite to the mask layer 133 on the other side of the base plate 131. The anti-reflection layer 170 is used for avoiding the incident light 300 forming a reflective light from the base plate 131 and the mask layer 133 that may affect the displayed image.

In FIG. 3A, the mask layer 133 is made from a material containing chromium (Cr) for blocking the incident light 300 and the reflective light 300'. The conductive layer 137 is made from a transparent and highly conductive material. Indium tin oxide (ITO) or index matched indium tin oxide (IM-ITO), possessing excellent characteristics of transparency and conductivity, is often used as the material for the conductive layer 137. The base plate 131 is exemplified by a glass substrate because the incident light 300 and the reflective light 300', controlled by the liquid crystal layer 150 must pass through the transparent substrate 130.

Figure 3B:
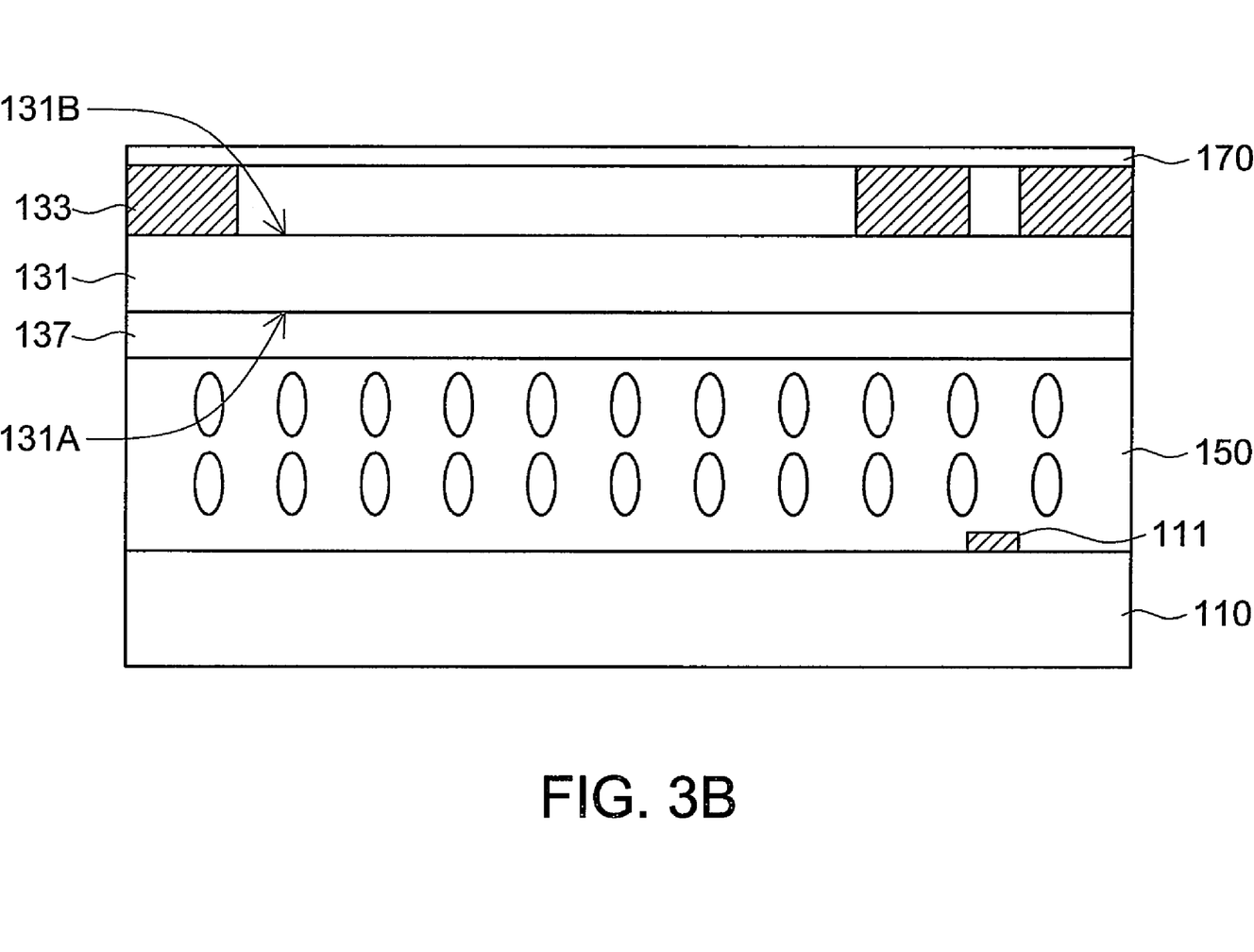
FIGS. 3B and 3C are drawings showing the mask layer in FIG. 3A disposed at different locations.
Figure 3C:
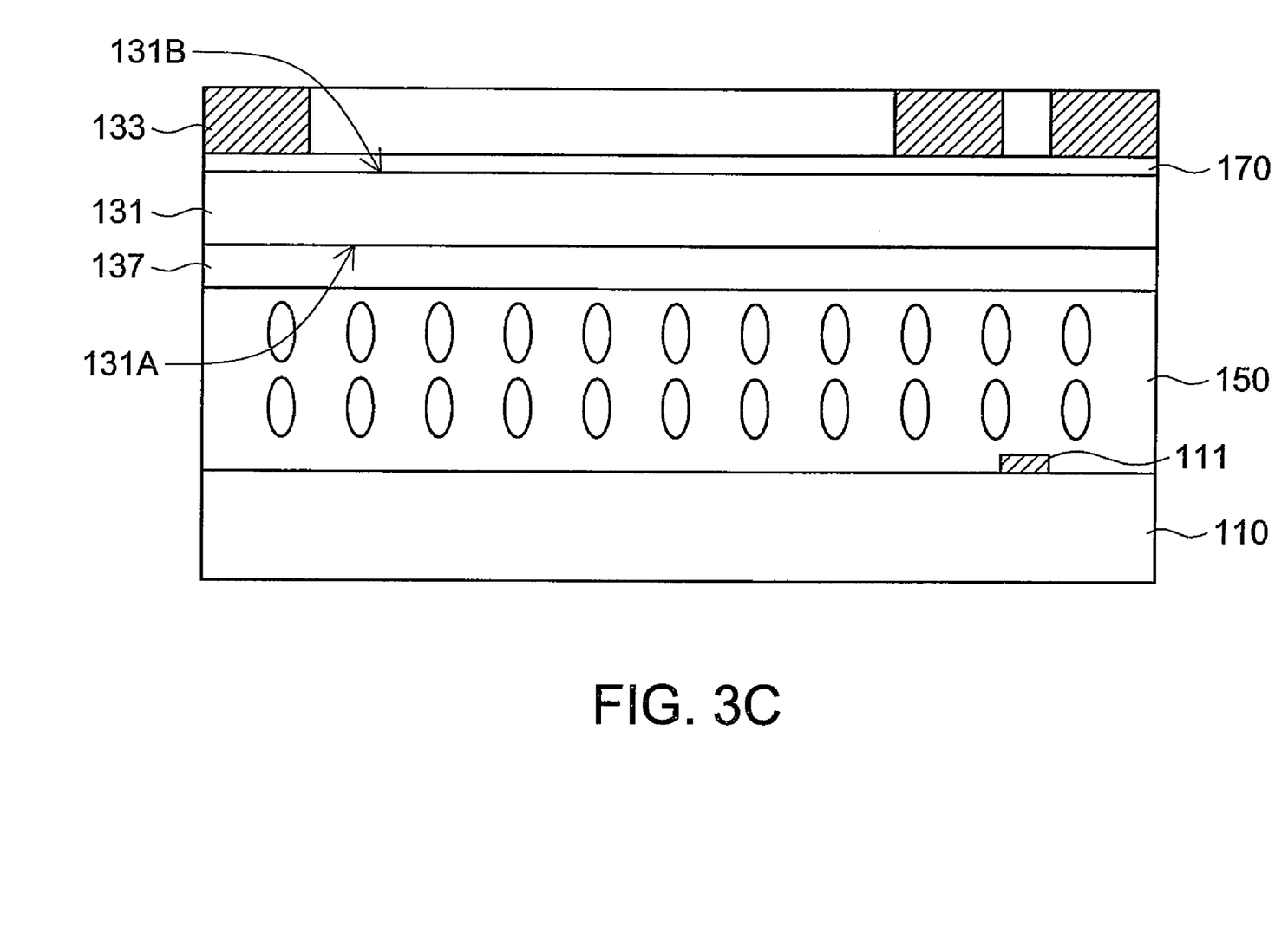

The mask layer 133 mentioned above is disposed between the conductive layer 137 and the base plate 131 for illustration purposes, however the invention is not limited thereto. FIGS. 3B and 3C are drawings showing the mask layer in FIG. 3A disposed at different locations. As shown in FIG. 3B, the base plate 131 has a first surface 131A and a second surface 131B opposite to the first surface 131A that faces the silicon substrate 110. The conductive layer 137 is disposed on the first surface 131A. The mask layer 133 is disposed on the second surface 131B and between the base plate 131 and the anti-reflection layer 170. Or, as shown in FIG. 3C, the anti-reflection layer 170 is disposed on the second surface 131B, and the mask layer 133 is disposed on the anti-reflection layer 170 as the outmost layer. Since the conductive layer 137 is directly disposed on the base plate 131 rather than the mask layer 133, the formation of the conductive layer 137 is more easily achieved due to the flat first surface 131A of the base plate 131. Besides, as the mask layer 133 is made from the material containing Cr, or other metals, the cleanness of the mask layer 133 is quite important for fear of the contamination to the conductive layer 137. The manner that the mask layer 133 and the conductive layer 137 being disposed on different surfaces of the base plate 131 also lowers the opportunity of deteriorating the conductive layer 137.

Figure 5:
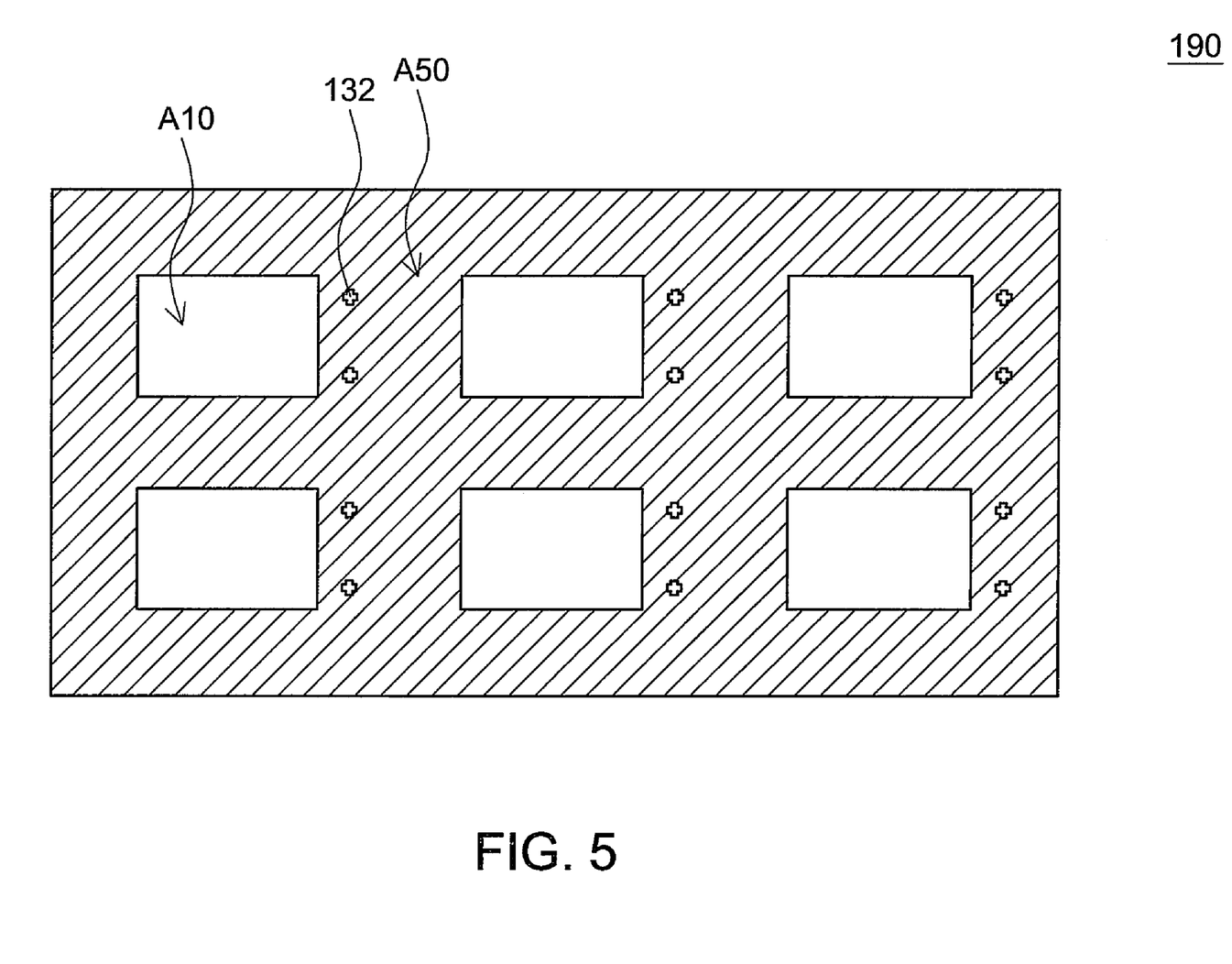
FIG. 5 is a perspective of many transparent substrates before being cut apart from a glass according to the first embodiment of the invention.
Figure 6:
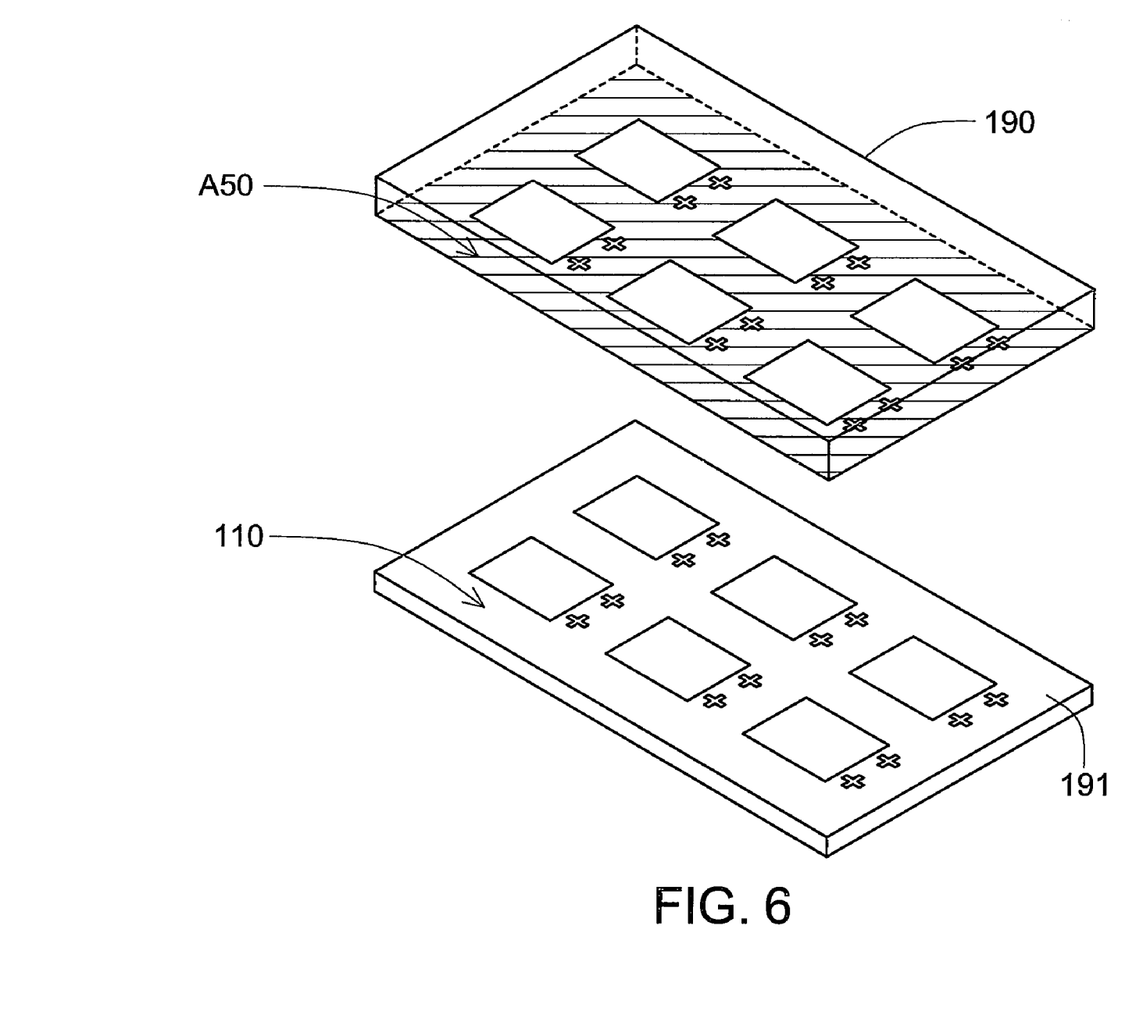
FIG. 6 is a perspective of forming LCOS display panel according to the first embodiment of the invention.

Referring to FIG. 5, a perspective of many transparent substrates before being cut from a glass according to the first embodiment of the invention is shown. The mask layer 133 (showed in FIGS. 3A to 3C) can be formed by lithography process. Firstly, coating photoresist forms a layer on a glass 190 that is used to produce a plurality of base plates 131. Then, patterning the photoresist forms patterns on the glass 190 by exposure and development, so that the photoresist strips from a light-blocking region A50 of the glass 190, and the part of the glass 190 corresponding to the displaying region A10 and the first alignment figure 132 is covered by the photoresist. Then, depositing chromium forms a layer on the glass 190 by way of thin-film process such as evaporation or sputtering, wherein the chromium is deposited on the surface of the glass 190 corresponding to the light-blocking region A50 and deposited on the photoresist except the light-blocking region A50 of the glass 190. Lastly, the photoresist and the chromium disposed thereon are removed by lift-off process. There are many displaying regions A10, many first alignment figures 132, and the light-blocking region A50 formed on the glass 190. Then referring to FIG. 6, a perspective of forming LCOS display panel according to the first embodiment of the invention is shown. A substrate 191 includes a plurality of uncut silicon substrates 110. Each silicon substrate 110 corresponds to one of the displaying regions of the glass 190. After sealing liquid crystal between the glass 190 and the substrate 191 and aligning the glass 190 with the substrate 191, several LCOS display panels 100 are formed after cutting the glass 190 and the substrate 191 on the light-blocking region A50.

Figure 7:
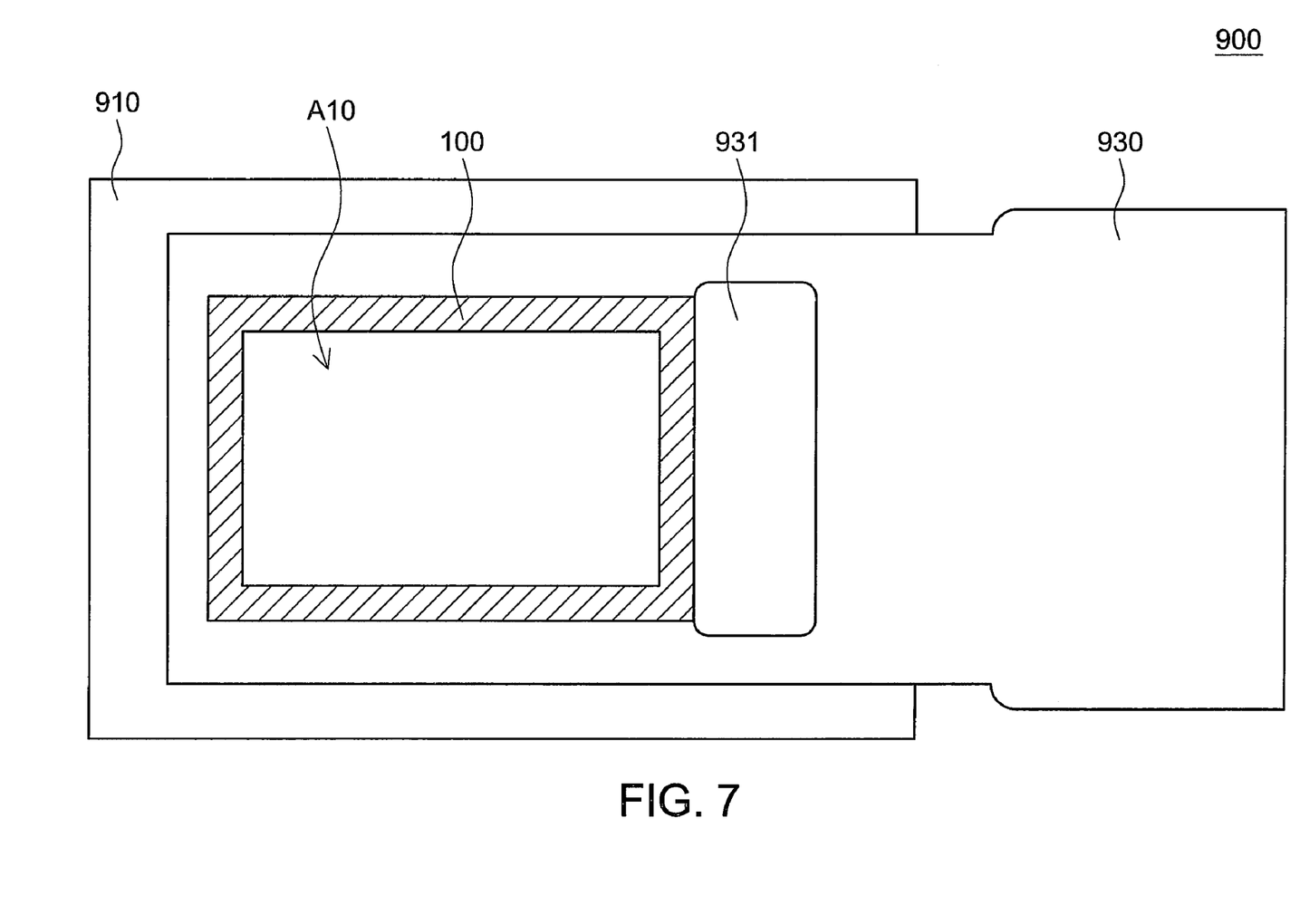
FIG. 7 is a perspective of an electronic device according to a first embodiment of the invention.

Referring to FIG. 7, a perspective of an electronic device according to a first embodiment of the invention is shown. The electronic device 900 comprises the LCOS display panel 100, a heat sink 910 and a circuit board 930. The LCOS display panel 100 is disposed on the heat sink 910. The circuit board 930 comprises a wire protection glue 931. The circuit board 930 is electrically connected to the LCOS display panel 100, the electrical point between the circuit board 930 and the LCOS display panel 100 is protected by the wire protection glue 931. The circuit board 930 is exemplified by a flexible circuit board (FPC). As the displaying region A10 of the LCOS display panel 100 is already defined by the mask layer 133, there is no need for a conventional shadow film to be bound on the LCOS display panel 100 during the assembly of the electronic device 900.

An LCOS display panel and an electronic device using the same are disclosed in the above embodiments of the invention. The displaying region of the LCOS display panel is positioned on the transparent substrate and defined by the mask layer. When an electronic device is installed with the LCOS display panel, the conventional mounting error of the shadow film is avoided, hence reducing the overall mounting error of the electronic device. Therefore, the displaying region of the LCOS display panel of the present embodiment of the invention can be defined more precisely. Furthermore, during the optical test of the LCOS display panel, the error caused by additional reflective light is avoided, hence increasing the yield rate of the electronic device.

Second Embodiment

The transparent substrate of the second embodiment of the invention differs with that of the first embodiment in the design of the mask layer. As for other elements similar to the first embodiment, the same designations are used and are not repeated here.

Figure 8:
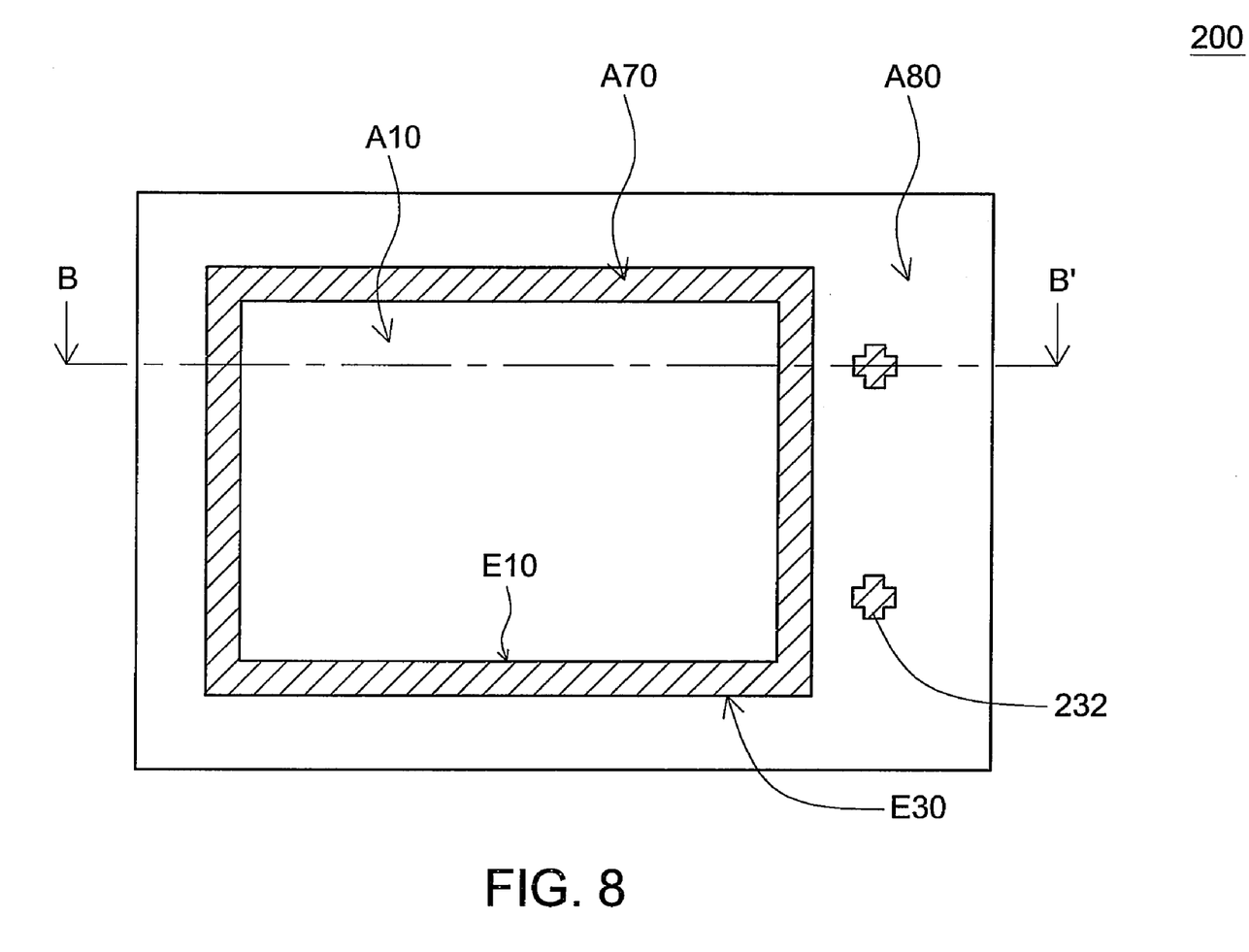
FIG. 8 is a top view of an LCOS display panel according to a second embodiment of the invention.
Figure 9A:
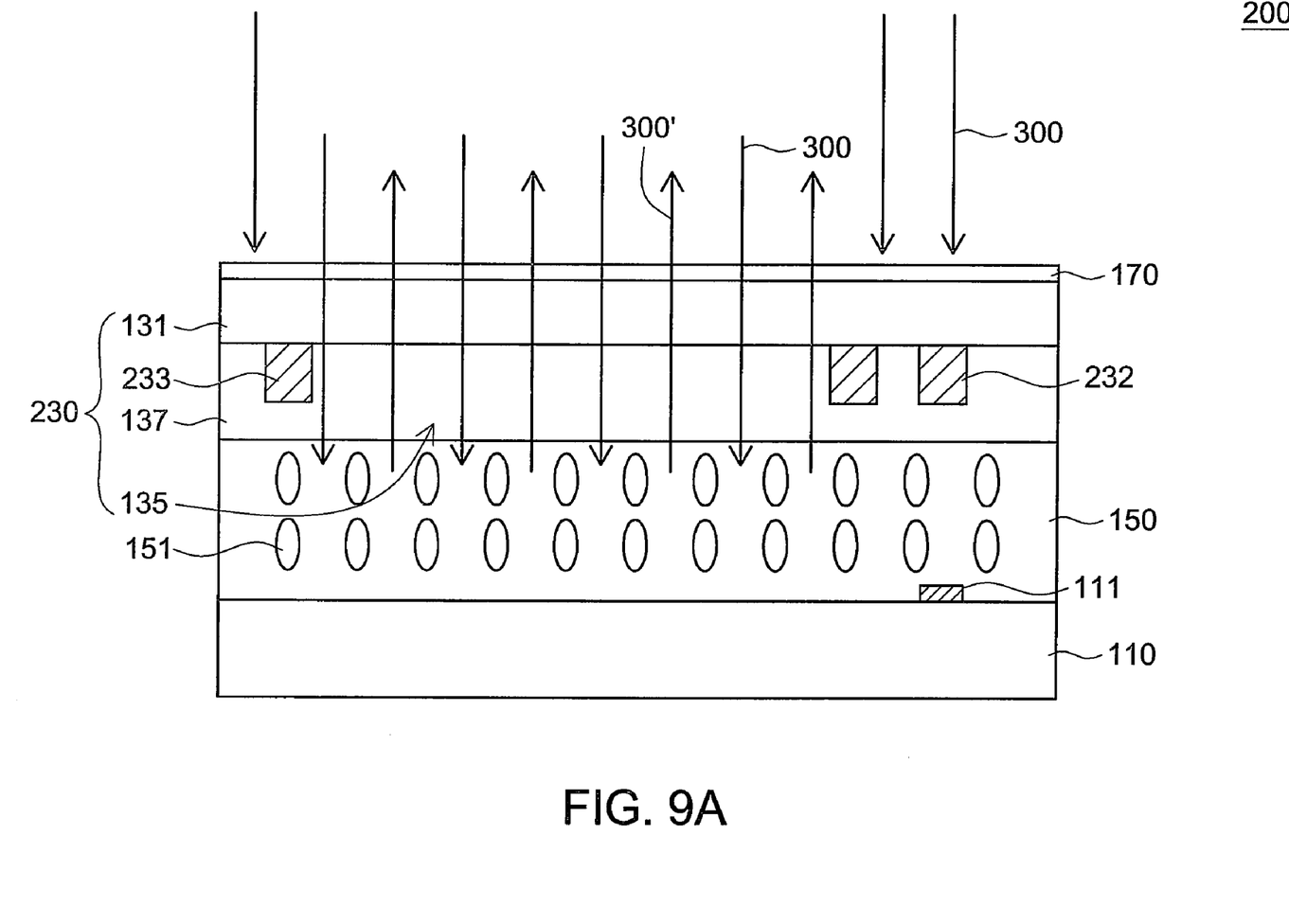
FIG. 9A is a cross-sectional view of the LCOS display panel of FIG. 8 along B-B' segment.

Referring to FIG. 8 and FIG. 9A. FIG. 8 is a top view of an LCOS display panel according to a second embodiment of the invention. FIG. 9A is a cross-sectional view of the LCOS display panel of FIG. 8 along B-B' segment. The LCOS display panel 200 comprises a silicon substrate 110, a transparent substrate 230, a liquid crystal layer 150 and an anti-reflection layer 170. The anti-reflection layer 170 is disposed on the transparent substrate 230. The transparent substrate 230 is disposed opposite to the silicon substrate 110, and the liquid crystal layer 150 is positioned between the silicon substrate 110 and the transparent substrate 230. The transparent substrate 230 comprises a base plate 131, a mask layer 233 and a conductive layer 137. The mask layer 233 is disposed on the base plate 131 and has the opening 135 for the transparent substrate 130 to form a light-transmitting region and a light-blocking region A70. The light-transmitting region is the displaying region A10 of the transparent substrate 230. An inner edge E10 of the light-blocking region A70 is the boundary of the light-transmitting region. Moreover, the light-blocking region A70 of the mask layer 233 does not cover the entire edge of the transparent substrate 230, and an outer edge E30 of the light-blocking region A70 is the boundary of a non-displaying region A80.

Furthermore, the transparent substrate 230 further comprises a first alignment figure 232 positioned in the non-displaying region A80. As indicated in FIG. 9A, the silicon substrate 110 comprises a second alignment figure 111, wherein the first alignment figure 232 and the second alignment figure 111 according to the second embodiment of the invention are positioned corresponding to each other. Thus, the transparent substrate 230 can be precisely aligned with the silicon substrate 110 by means of the first alignment figure 232 and the second alignment figure 111, and the displaying region A10 is positioned in a predetermined location.

As indicated in FIG. 9A, preferably, the mask layer 233 and the first alignment figure 232 are formed at the same time, and the first alignment figure 232 and the mask layer 233 are made from the same material.

Figure 9B:
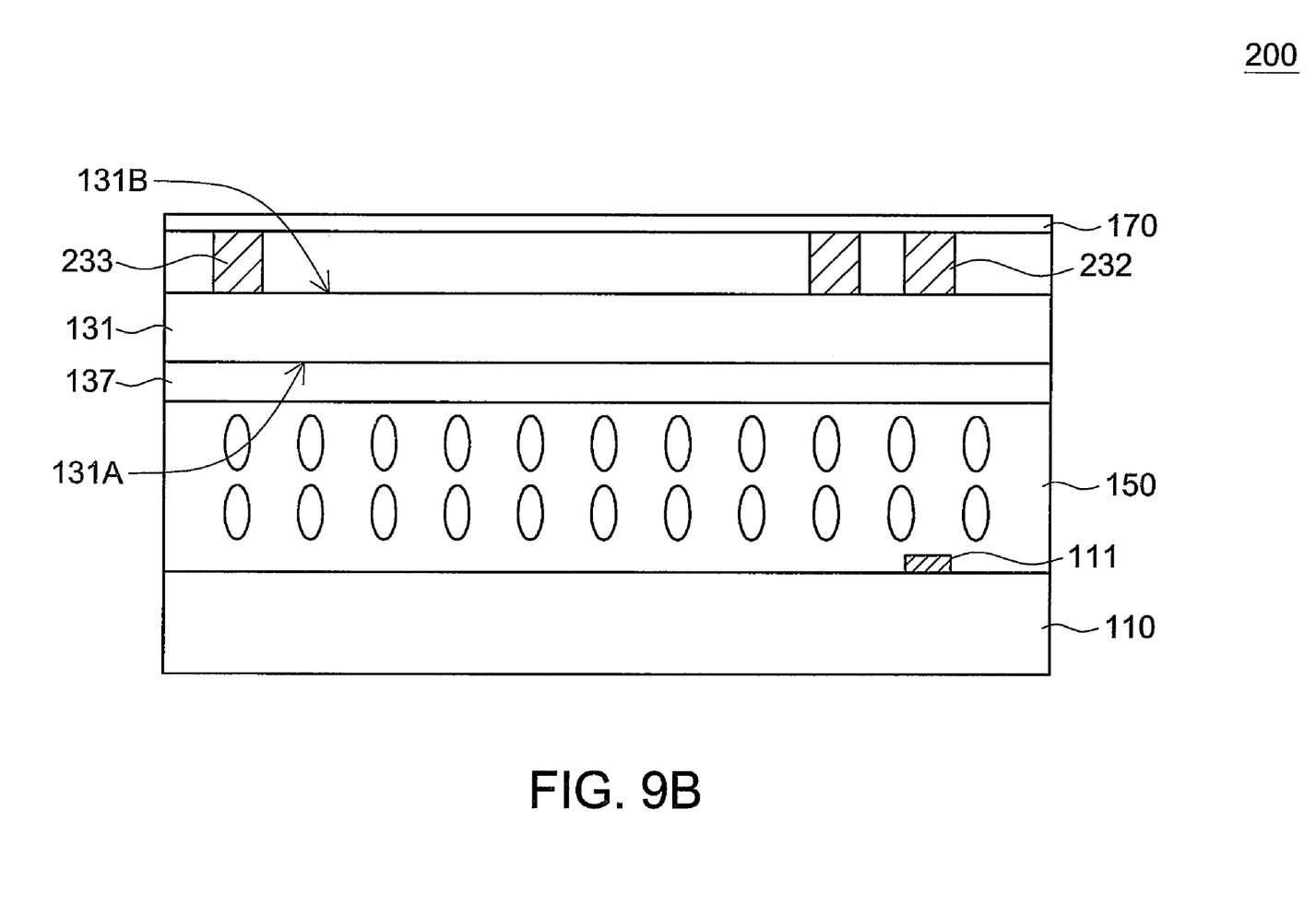
FIGS. 9B and 9C are drawings showing the mask layer in FIG. 9A disposed at different locations.
Figure 9C:
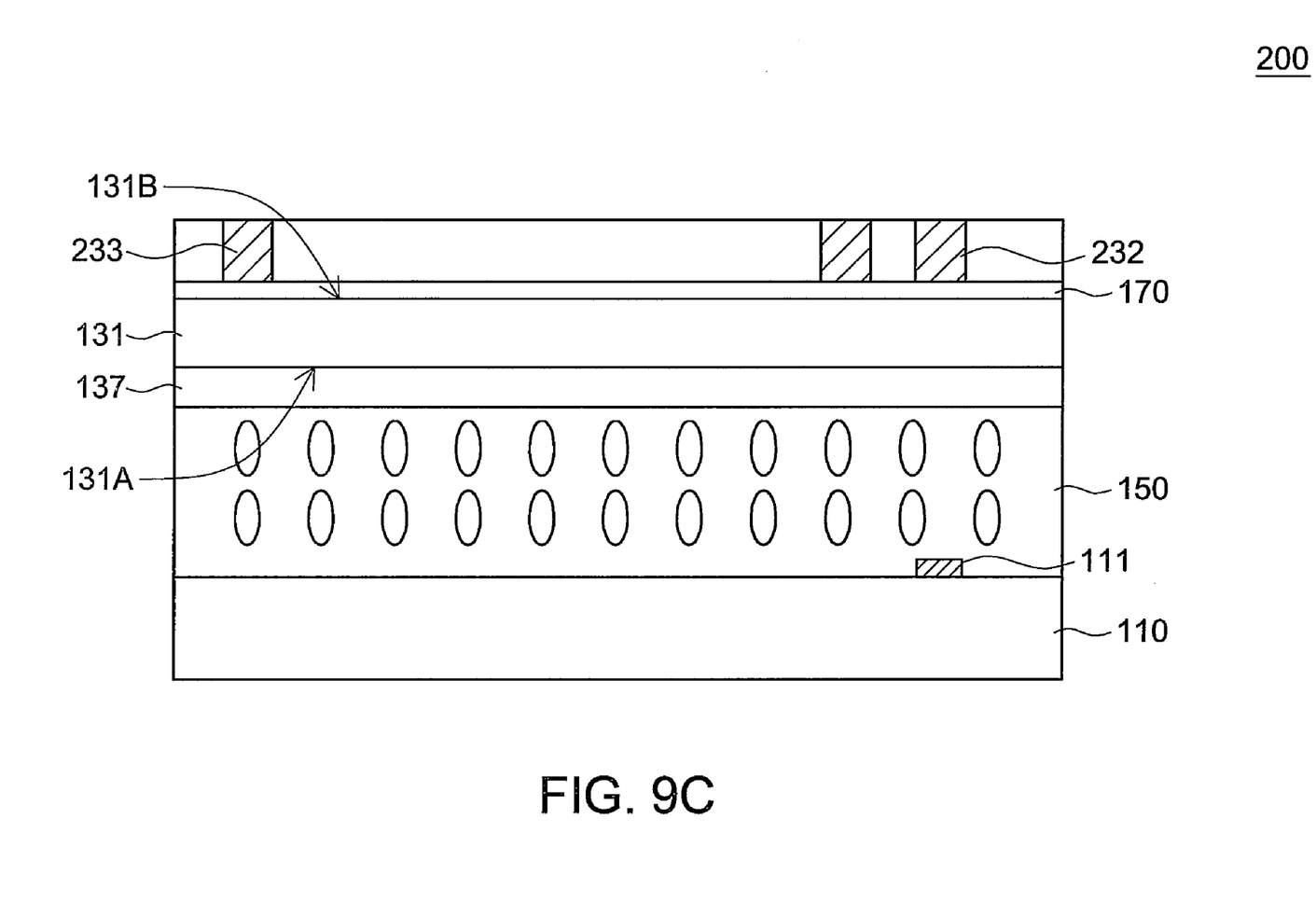

Besides being disposed between the conductive layer 137 and the base plate 131, the mask layer 233 can also be disposed at different locations, as shown in FIGS. 9B and 9C. In FIG. 9B, the base plate 131 has a first surface 131A and a second surface 131B opposite to the first surface 131A that faces the silicon substrate 110. The conductive layer 137 is disposed on the first surface 131A. The mask layer 233 is disposed on the second surface 131B and between the base plate 131 and the anti-reflection layer 170. Or, as shown in FIG. 9C, the anti-reflection layer 170 is disposed on the second surface 131B, and the mask layer 233 is disposed on the anti-reflection layer 170 as the outmost layer. The manner that the mask layer 233 and the conductive layer 137 disposed on different surfaces of the base plate 131 facilitates the formation of the conductive layer 137, as well as lowers the opportunity of contaminating and deteriorating the conductive layer 137.

Figure 10:
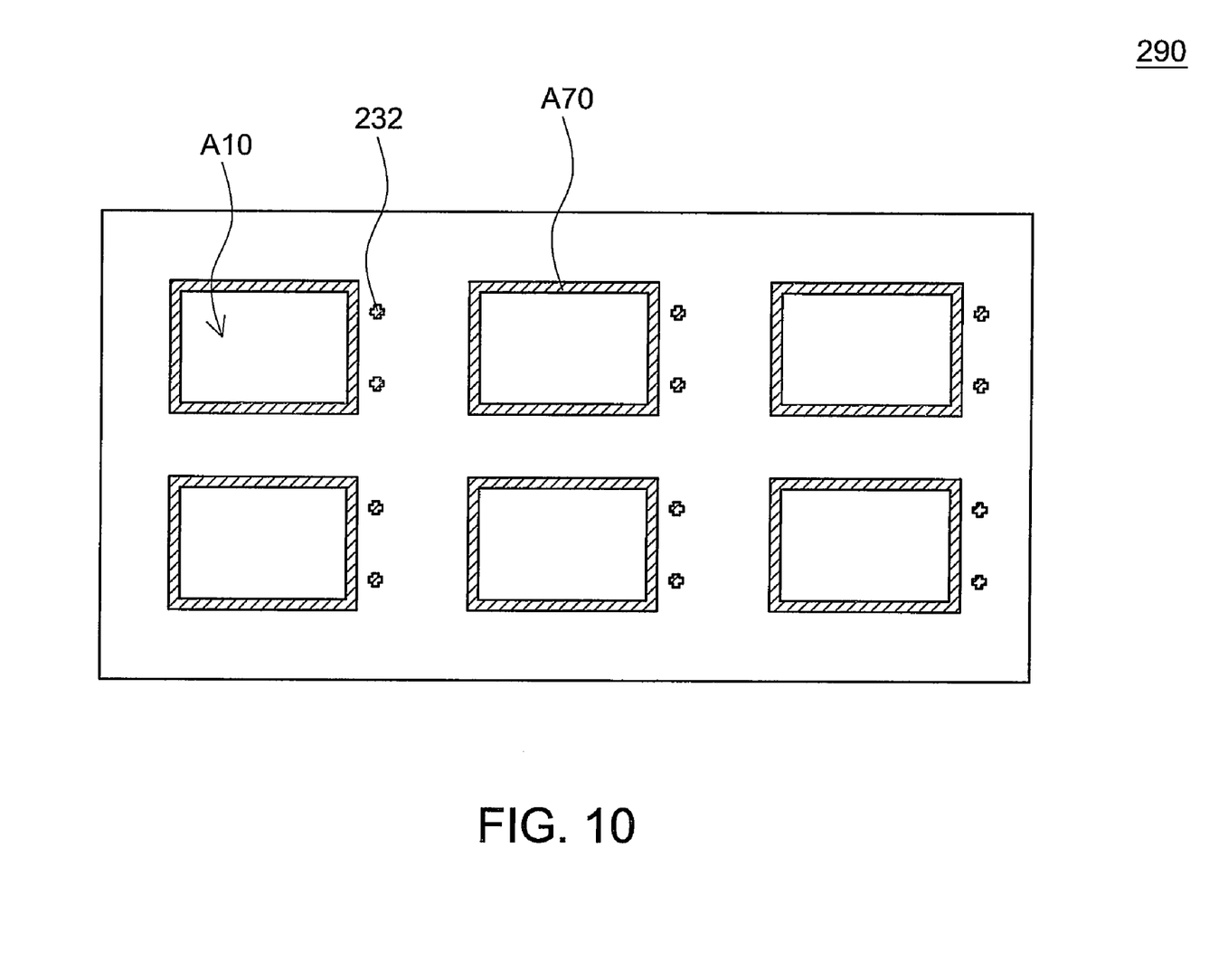
FIG. 10 is a perspective of many transparent substrates before being cut from a glass according to the second embodiment of the invention.

Referring to FIG. 10, a perspective of many transparent substrates before being cut from a glass according to the second embodiment of the invention is shown. The displaying region A10, the light-blocking region A70, and the first alignment figure 232 are formed on a glass 290. The forming method for the above elements on the glass 290 is based on the lithography method described in the first embodiment, so it is not repeated herein.

The transparent substrate of the LCOS display panel disclosed in the present embodiment of the invention comprises a displaying region and a non-displaying region. As there is no need for the non-displaying region to form chromium on the glass, the use of chromium is reduced hence reducing the cost of the transparent substrate.

Despite the LCOS display panel and an electronic device using the same are disclosed in above embodiments of the invention, however, the embodiments are not for limiting the scope of the invention. Any one who is skilled in the technology of the invention will understand that the first alignment figure, displaying region and light-blocking region can have different shapes and positions. Any designs of forming a light-blocking region and a light-transmitting region on the transparent substrate of the LCOS display panel and using the light-transmitting region as a displaying region are within the scope of the invention.

An LCOS display panel and an electronic device using the same are disclosed in the above embodiments of the invention. The displaying region of the LCOS display panel is directly defined on the transparent substrate by the mask layer without using any additional shadow films, hence reducing cumulative error during the assembly of the electronic device. Furthermore, as the LCOS display panel is optically aligned, the mounting error can be controlled to be within the range of tens to hundreds of nanometer. With the displaying region of the LCOS display panel of the invention is precisely defined, the display quality of the electronic device is further improved.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A liquid crystal on silicon (LCOS) display panel, comprising:
   a silicon substrate;
   a transparent substrate, disposed opposite the silicon substrate and having a base plate, a conductive layer, a first alignment figure and a mask layer, wherein the base plate has a first surface and a second surface opposite to the first surface, the first surface faces the silicon substrate, the conductive layer is disposed on the first surface, the first alignment figure is disposed on the second surface, the mask layer is disposed on the second surface and has at least one opening to form at least one light-blocking region and one light-transmitting region on the base plate, and the light-transmitting region is a displaying region of the transparent substrate;
   an anti-reflection layer disposed on top or below a bottom surface of the mask layer and the displaying region is covered by the anti-reflection layer; and
   a liquid crystal layer, positioned between the silicon substrate and the conductive layer of the transparent substrate.

2. The LCOS display panel according to claim 1, wherein the silicon substrate comprises a second alignment figure, which corresponds to the first alignment figure.

3. The LCOS display panel according to claim 1, wherein the first alignment figure is located in the light-blocking region.

4. The LCOS display panel according to claim 3, wherein the first alignment figure is formed by a through hole of the mask layer.

5. The LCOS display panel according to claim 1, wherein the first alignment figure is located in a non-displaying region of the transparent substrate.

6. The LCOS display panel according to claim 5, wherein a material for forming the first alignment figure is the same as that of the mask layer.

7. The LCOS display panel according to claim 1, wherein a boundary of the displaying region is defined by the light-blocking region.

8. The LCOS display panel according to claim 1, wherein the anti-reflection layer is disposed between the base plate and the mask layer.

9. The LCOS display panel according to claim 1, wherein the mask layer is disposed between the base plate and the anti-reflection layer.

10. The LCOS display panel according to claim 1, wherein the mask layer is made of chromium.

11. An electronic device, comprising:
    a circuit board; and
    a LCOS display panel, electrically connected to the circuit board, having;
       a silicon substrate;
       a transparent substrate, having a base plate, a conductive layer, a first alignment figure and a mask layer disposed on the base plate, wherein the base plate has a first surface and a second surface opposite to the first surface, the first surface faces the silicon substrate, the conductive layer is disposed on the first surface, the first alignment figure is disposed on the second surface, the mask layer is disposed on the second surface and has at least one opening to form at least one light-blocking region and one light-transmitting region on the base plate, and the light-transmitting region is a displaying region of the transparent substrate;
       an anti-reflection layer disposed on top or below a bottom surface of the mask layer and the displaying region is covered by the anti-reflection layer; and
       a liquid crystal layer, positioned between the silicon substrate and the conductive layer of the transparent substrate.

12. The electronic device according to claim 11, wherein the silicon substrate comprises a second alignment figure, which corresponds to the first alignment figure.

13. The electronic device according to claim 11, wherein the first alignment figure is located in the light-blocking region.

14. The electronic device according to claim 13, wherein the first alignment figure is formed by a through hole of the mask layer.

15. The electronic device according to claim 11, wherein the first alignment figure is located in a non-displaying region of the transparent substrate.

16. The electronic device according to claim 15, wherein a material for forming the first alignment figure is the same as that of the mask layer.

17. The electronic device according to claim 11, wherein the anti-reflection layer is disposed between the base plate and the mask layer.

18. The electronic device according to claim 11, wherein the mask layer is disposed between the base plate and the anti-reflection layer.

* * * * *